Patented Jan. 29, 1929.

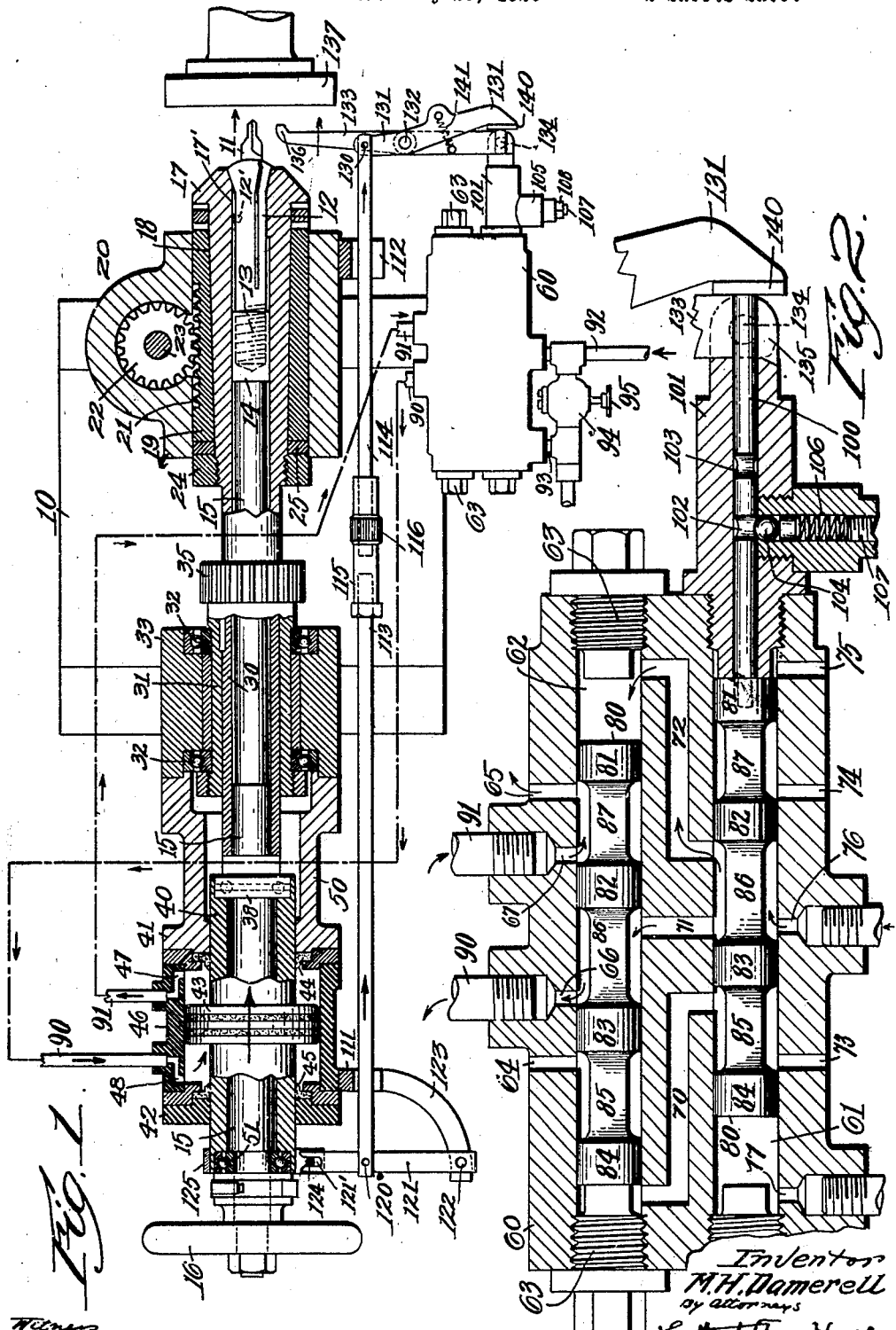

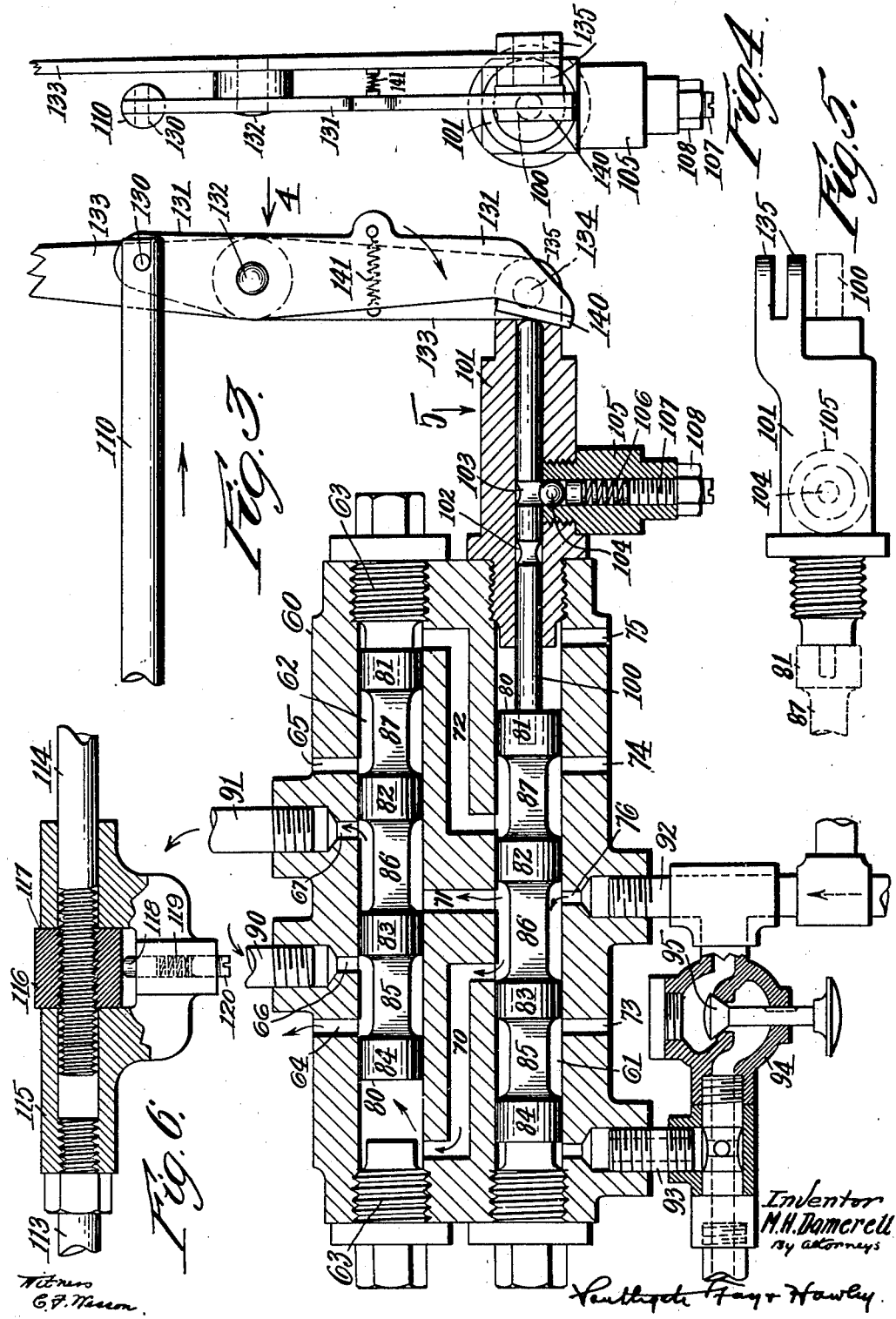

1,700,668

UNITED STATES PATENT OFFICE.

MARK H. DAMERELL, OF WORCESTER, MASSACHUSETTS, ASSIGNOR TO WYMAN-GORDON COMPANY, OF WORCESTER, MASSACHUSETTS, A CORPORATION OF MASSACHUSETTS.

CENTER DRILLING MACHINE.

Application filed May 29, 1926. Serial No. 112,670.

This invention relates to a machine for drilling centers in the ends of shafts, such as crank shafts.

After crank shafts or similar structures have been forged and before subsequent operations are performed thereon, center holes must be drilled in the ends thereof. This invention relates to a machine for performing this function quickly and accurately.

The general object of this invention is to provide a machine so constructed and arranged that when set into operation, the machine will automatically advance the tool or drill into the work and thereafter withdraw the tool from the work after center drilling the same.

Another object of the invention is to provide a machine of the character described, so constructed that it will move the tool into the work a predetermined distance and then automatically withdraw the tool from the work.

A still further object of the invention is to provide a machine of the character specified so constructed that when set into operation the machine will automatically complete its cycle and will accurately drill holes of the desired depth in one or both ends of a shaft mounted therein.

Further objects of the invention will appear in the following specification, taken in connection with the drawings which form a part of this application and in which Fig. 1 is a longitudinal sectional view of the machine constructed in accordance with the invention;

Fig. 2 is an enlarged section showing the valve mechanism for controlling the operation of the tool;

Fig. 3 is a view similar to Fig. 2 but showing further elements of the valve mechanism and illustrating the valves in a different position of adjustment from that shown in Fig. 2;

Fig. 4 is an end elevation of the lever mechanism for operating the slide valve;

Fig. 5 is an elevational view taken at right angles at Fig. 3 and showing a portion of the valve mechanism; and Fig. 6 is a sectional elevation of adjusting means for the valve control rod.

The invention briefly described comprises a tool, such as a drill, mounted for rotation and also mounted for longitudinal movement into and out of the work operated upon. In the particular form of the invention shown, the tool is moved longitudinally by pneumatic means, and valve mechanism is provided for automatically controlling the pneumatic means in such a manner that after being set in operation, the tool will be moved automatically into the work a predetermined distance and will then be automatically moved out of the work to its initial position, in which position it will remain until the pneumatic means is again set in operation.

Further details of the invention will appear from the following specification:

Drill mounting.

In the particular form of the invention illustrated, the tool consists of a rotary drill mounted on a support or base 10. The drill 11 is mounted in a collet 12 of the usual construction which has a threaded portion 13 threaded into the front end 14 of an elongated spindle or rod 15. The rod 15 has a hand wheel 16 secured in the rear end thereof and by rotating said hand wheel and rod, the collet 12 will be drawn into a chuck or holder 17. The collet 12 has a pin 12' positioned in a longitudinal internal groove 17' in the chuck 17 to prevent rotation of the collet when the collet is drawn into the chuck. The chuck 17 has a conical outer surface 18 mounted to rotate in a bearing or sleeve 19 which is slidably mounted in a support 20. The sleeve 19 has rack teeth 21 which are engaged by a gear 22, carried by a shaft 23 and the tool can be moved longitudinally by manually rotating the shaft 23. A nut 24 is threaded on a rear end of the chuck 17 and a collar 25 is interposed between the nut and bearing 19.

The holder or chuck 17 is extended rearwardly in the form of a sleeve 30. This sleeve is keyed to or splined to a sleeve 31 which is mounted in ball bearings 32, carried by a support 33. The sleeve 31 has secured thereto, a spur gear 35 which may be driven from any suitable source of power and will rotate the sleeve. As the sleeve 31 is rotated, the sleeve 30 will also be rotated by reason of the keyed or splined connection thereto.

The rear end of the sleeve 30 bears against a ball-thrust bearing 38, which will take up the end thrust as the drill is moved forwardly into the work. The ball-thrust bearing is carried at the front end of a hollow piston rod 40, which is mounted to slide in bearings 41 and 42 and has secured to the center portion thereof, a piston head 43. Packing 44 and 45 is provided for preventing the escape of compressed air or other operating fluid from a cylinder 46 in which the piston is mounted. The cylinder 46 has ports 47 and 48 leading to the two ends thereof.

A casing 50 is secured to one end of the cylinder 46 and is secured at its other end to the casing or support 33.

The rear end of the hollow piston rod 40 has mounted therein a ball bearing 51 for supporting the rear end portion of the spindle or rod 15 on which the hand wheel 16 is secured.

When air or other motive fluid is admitted to one end or the other of the cylinder 46, the sleeve 30 and parts associated therewith will be moved toward or away from the work, the drill being rotated at the same time by means of the splined connection between the sleeve 30 and the rotating sleeve 31. The admission of motive fluid to one end of the cylinder and the exhaust of the fluid from the other end of the cylinder is controlled by valve mechanism, which in turn is automatically controlled to reverse the longitudinal movement of the tool after the tool has moved a predetermined distance into the work.

*Valve mechanism.*

The valve mechanism comprises a valve casing 60, having a pair of valve chambers 61 and 62. The ends of the chamber 62 are closed by plugs 63 and this chamber has leading thereinto, air vent ports 64 and 65 and also ports 66 and 67 which serve alternately as inlet and exhaust ports. For instance, in Fig. 2 the port 67 communicates with the air vent 65 and therefore is serving as an exhaust port. The port 66 is receiving motive fluid from chambers 61 and 62 in a manner hereinafter explained and thus serves as an intake port. The chamber 62 communicates with the chamber 61 through passages 70, 71 and 72.

The chamber 61 is provided with vent ports 73, 74 and 75 and with a pair of intake ports 76 and 77. Each of the chambers 61 and 62 has mounted therein a slide valve 80 having a plurality of cylindrical portions or heads 81, 82, 83 and 84, which are connected by reduced portions 85, 86 and 87.

It will be noted that when the cylindrical portions or heads are disposed in the chamber between two ports, communication between these ports will be blocked, whereas when the reduced portions are so disposed, communication will be open to these ports.

The ports 66 and 67 which communicate with the chamber 62 are connected by conduits 90 and 91 to the ports 48 and 47 which communicate with the ends of the cylinder 46.

As shown in Fig. 3, the ports 66 and 67 have connected thereto, conduits 92 and 93. The conduit 92 receives motive fluid, preferably compressed air from a source of supply, and the conduit 93 communicates with the conduit 92 through a valve casing 94. The passage through this valve is controlled by a valve 95. In actual practice the conduits 92 and 93 will also be connected to a similar valve mechanism at the other end of the machine for operating a tool for drilling the opposite end of the crank shaft or other work mounted in the machine.

The valve mounted in the chamber 61 has secured to the end thereof, a spindle or rod 100, slidably mounted in and extending through an extension or plug 101 secured to the valve casing 60. The rod 100 has formed therein, a pair of annular grooves 102, and 103 adapted to be engaged by a ball 104, which is mounted in a plug 105 threaded into the extension 101. The ball 104 is spring pressed in one direction by a spring 106, one end of which is engaged by a screw 107 which is secured in adjusted position by a lock nut 108. It will be evident that when the rod 100 is adjusted to a position in which the ball will register with the groove that the ball will be spring pressed in the groove, and will form a non-positive stop for holding the rod in adjusted position. The grooves are so formed that when the slide valve in the chamber is positioned in its extreme left position, as shown in Fig. 3, the ball 104 will seat in the groove 103. When the valve is adjusted to the right hand end of the valve chamber, as shown in Fig. 2, the ball will seat in the groove 102.

Fig. 2 illustrates the valve mechanism adjusted to a position in which the motive fluid or compressed air which enters the chamber 61 through the port 76, passes through the port 71 and out of the chamber 62 through the port 66 and thus through the conduit 90 into the left hand end of the cylinder 46. The fluid will therefore move the piston head 43 to the right and will thus move the drill in a direction toward and into the work. The motive fluid from the port 76 will also pass through the passage 72 into the right hand end of the chamber 62 and will thus tend to force the valve in the chamber 62 to the left and maintain the valve in this position until the valve mechanism is automatically shifted in a manner hereinafter described. When the valve is adjusted as in Fig. 2 and air is passing into cylinder 46 through conduit 90, air will leave the other end of the cylinder through conduit 91 and will pass through port 67, chamber 62 and out through vent 65.

When the drill has moved a predetermined distance into the work, the valve mechanism will be automatically shifted in a manner which will now be described so that the motive fluid will be introduced into the right hand end of the cylinder 46 and will cause the cylinder to withdraw from the work.

*Valve control mechanism.*

In the particular form of the invention shown, the valve control mechanism comprises a rod 110, slidably mounted in guides 111 and 112. The rod 110 is preferably made in two sections 113 and 114, the end 113 being threaded into a coupling 115 and the end of the section 114 being slidably mounted in the opposite end of this coupling. A knurled nut 116 is mounted on the end of the rod 114 in a recess 117 formed in the coupling. This nut is engaged by a pin 118 which is spring pressed into engagement with a nut by means of a spring 119, confined by a screw 120. It will thus be seen that by rotating the nut 116, the length of the rod formed by the sections 113 and 114 can be varied to suit requirements.

The left hand end of the rod in Fig. 1 is pivotally connected at 120 to a lever 121 which is pivoted at one end 122 to a bracket 123 fixed to the frame of the machine. At its opposite end the lever 121 is bifurcated as shown at 121′ and the bifurcated end receives a pin 124 carried by the collar 125 which is clamped to the rear end or left hand end (Fig. 1) of the piston rod 40.

The opposite end of the rod 110 or of the section 114 thereof is pivoted at 130 to the upper end of a lever 131 which in turn is pivoted intermediate at its ends at 132 to a lever 133. The lever 133 is pivoted at its lower end at 134 between a pair of lugs 135 disposed at the front end of the extension 101. The lever 133 extends upwardly beyond the rod section 114 and has an offset end 136 adapted to act as a feeler and to engage the work 137 as the rod 110 or the rod sections 113 or 114 are moved longitudinally with the movement of the tool.

The lower end of the lever 131 has secured thereto a plate 140 which is positioned as shown in Figs. 2 and 3 to engage the outer end of the rod 100. In order to retain the plate in engagement with the rod at all times, a spring 141 is secured to the lever 131 below its pivot 132 and to the lower end portion of the lever 133. This spring tends to swing the lever 131 in a clockwise direction and retains the plate 140 in engagement with the outer end of the rod 100.

From the foregoing description of the mounting of the rod 110, it will be seen that the parallel link support for this rod and the connection to the piston 40 will give the feeler 136 the same amount of movement as the movement of the drill. As the drill moves into the work, the upper end or feeler 136 of the lever 133 will engage the work and when this takes place, the pivot 132 which has been swinging with the levers 131 and 133 will become fixed and further movement of the piston and of the drill will cause the rod 110 to swing the lever 131 about its pivot in a clockwise direction, thus moving the slide valve in the chamber 61 from the position shown in Fig. 2 to the position shown in Fig. 3. When the slide valve in the chamber 61 is thus shifted the motive fluid will pass from the port 76 through the passage 71 into the chamber 62 and out of this chamber through the port 67 and conduit 91 into the cylinder through the port 47. The motive fluid will also pass from the port 76 through the chamber 61 and through the passage 70 into the left hand end of the chamber 62, thus maintaining the slide valve in the chamber 62 against the plug 63 at the right hand end of this chamber. The left hand end of the cylinder 46 will communicate with the atmosphere through conduit 90, port 66 and vent 64.

When the piston head 43 has been moved to the back or left hand end of the cylinder 46, the drill will remain retracted until the operator presses upwardly on the valve 95, thus admitting air from the constant source of supply through the valve chamber 94 and through the conduit 93 to the left hand end of the valve chamber 61. This will cause the slide valve in this chamber to be shifted to the right or to the position shown in Fig. 2, whereupon the compressed air will be admitted to the rear or left hand end of the cylinder 46 and will move the tool toward the work and into drilling position.

The proportions of the levers connecting the piston 43 to the feeler end 136 are such that the part 136 is advanced or retracted equally with the drill point and maintains the same position relative thereto. Thus the drill always enters the work a predetermined distance before engagement of the feeler with the work and this entrance of the drill into the work remains constant, regardless of any reasonable variation in the total length of the work. The further advance movement of the drill during reversal of the valve mechanism is also substantially constant so that the total depth of the holes remains substantially unchanged by variations in length of work.

*General operation.*

From the foregoing description it will be seen that a machine has been provided whereby the drilling of center holes in crank shafts or other structures can be automatically accomplished, after the machine has been started in operation. Furthermore, by reason of the control mechanism described, the center holes will be accurately and uniformly drilled to a desired depth without any care or attention on the part of the operator. By adjusting the length of the control rod, the depth to which the drill will penetrate the work can be regulated as desired.

Although one specific form has been particularly shown and described, it will be understood that the invention is capable of modification and that changes in construction and arrangement of the various co-operating parts may be made without departing from the scope of the invention as expressed in the claims.

What I claim is:—

1. A drilling machine comprising a tool, means to rotate said tool, fluid pressure feeding means to produce relative movement between said tool and the work, in opposite directions, and automatically operable control mechanism adapted for abutment with the work for reversing operation of said fluid pressure means.

2. A drilling machine comprising a rotatable drill, means to rotate the drill, pneumatic feeding mechanism for moving the drill longitudinally into the work and for withdrawing the drill from the work, and automatically operable control mechanism movable with said drill, to abut the work for causing said pneumatic mechanism to reverse the longitudinal movement of the drill when the drill has moved a predetermined distance into the work.

3. A drilling machine comprising a rotatable drill, means to rotate the drill, feeding mechanism for moving the drill longitudinally into the work and for withdrawing the drill from the work, and automatically operable control mechanism movable with said drill, to abut the work for causing said mechanism to reverse the longitudinal movement of the drill when the drill has moved a predetermined distance into the work.

4. A drilling machine comprising a rotatable drill, means to rotate the drill, pneumatic feeding mechanism for moving the drill longitudinally into the work and for withdrawing the drill from the work, and automatically operable control mechanism for causing said pneumatic mechanism to reverse the longitudinal movement of the drill when the drill has moved a predetermined distance into the work, said control mechanism including a feeler movable with said drill to abut the work.

5. A drilling machine comprising a rotatable drill, means to rotate the drill, pneumatic feeding mechanism for moving the drill longitudinally into and out of the work, valve mechanism for controlling said pneumatic mechanism, and means including a feeler movable with the drill and adapted to abut the work for controlling said valve mechanism.

6. A drilling machine comprising a rotatable drill, means to rotate the drill, pneumatic feeding mechanism for moving the drill longitudinally into and out of the work, valve mechanism for controlling said pneumatic mechanism, and means including a feeler movable with the drill and adapted to abut the work for controlling said valve mechanism thereby to withdraw the drill from the work after the drill has moved into the work a predetermined distance.

7. A machine of the character described comprising a rotatable tool, means to rotate said tool, feeding mechanism for automatically moving the tool into and out of the work, valve mechanism for controlling the movement of the tool, and means, including a rod, movable with the tool and adapted to abut the work and operatively connected to said valve mechanism for shifting the valve and causing the tool to withdraw from the work after the tool has moved a predetermined distance into the work.

8. A machine of the character described comprising a rotatable tool, a piston connected thereto, a cylinder surrounding the piston, pneumatic means for actuating said piston to cause said tool to move longitudinally into and out of the work, and automatic control means including a member movable with said tool to abut the work for reversing the longitudinal movement of the piston when the tool has moved a predetermined distance into the work.

9. A machine of the character described comprising a rotatable tool, a piston connected thereto, a cylinder surrounding the piston, pneumatic means for actuating said piston to cause said tool to move longitudinally into and out of the work, and automatic control means including a member adapted to abut the work and valve mechanism controlled by said member for reversing the longitudinal movement of the piston when the tool has moved a predetermined distance into the work.

10. A machine of the character described comprising a rotatable tool, a piston connected thereto, a cylinder surrounding the piston, pneumatic means for actuating said piston to cause said tool to move longitudinally into and out of the work, valve mechanism for controlling the passage of motive fluid to the cylinder for actuating the piston, and automatically operable adjustable means synchronized with said tool, for controlling said valve mechanism and adapted to abut the work, thereby to reverse the movement of the piston and tool when the tool has moved a predetermined distance into the work.

11. A drilling machine comprising a rotatable drill, means to rotate said drill, pneumatic feeding mechanism for moving the drill longitudinally into and out of the work, valve mechanism for controlling said pneumatic mechanism, a feeler adapted to abut the work and movable with the tool as the tool is moved longitudinally, and means carried by and movable relative to the feeler for automatically controlling said valve mechanism.

12. A drilling machine comprising a rotatable drill, means to rotate said drill, pneumatic feeding mechanism for moving the drill longitudinally into and out of the work, valve mechanism for controlling said pneumatic mechanism, a feeler adapted to abut the work and movable with the tool as the tool is moved longitudinally, and means pivotally carried by the feeler for automatically controlling said valve mechanism.

13. A drilling machine comprising a rotatable drill, pneumatic mechanism for moving the drill longitudinally into and out of the work, valve mechanism for controlling said pneumatic mechanism, a rod movable with the tool as the tool is moved longitudinally, a feeler adapted to abut the work, and a valve actuating lever connected to the rod and to the feeler and adapted to actuate the valve mechanism subsequent to the engagement of the work by the feeler.

14. A drilling machine comprising a rotatable drill, pneumatic mechanism for moving the drill longitudinally into and out of the work, valve mechanism for controlling said pneumatic mechanism, a rod movable with the tool as the tool is moved longitudinally, a feeler engageable with the work, and a valve actuating lever pivotally connected to the rod and to the feeler and adapted to actuate the valve mechanism subsequent to the engagement of the work by the feeler.

15. A drilling machine comprising a rotatable drill, pneumatic mechanism for moving the drill longitudinally into and out of the work, valve mechanism for controlling said pneumatic mechanism, a rod movable with the tool as the tool is moved longitudinally, a feeler engageable with the work, and a valve actuating lever pivotally connected to the rod and to the feeler and adapted to actuate the valve mechanism subsequent to the engagement of the work by the feeler in a manner to shift the valve mechanism and reverse the movement of the tool.

16. A drilling machine comprising a rotatable drill, means to rotate said drill, pneumatic feeding mechanism for moving the drill longitudinally into and out of the work, valve mechanism for controlling said pneumatic mechanism, means including a feeler movable with said drill and adapted to abut the work for controlling said valve mechanism, and means for adjusting said feeler to vary the engagement of the feeler with the work to determine the extent of drill movement into the work.

17. A drilling machine comprising a rotatable drill, means to rotate said drill, pneumatic feeding mechanism for moving the drill longitudinally into and out of the work, valve mechanism for controlling said pneumatic mechanism, means including a feeler movable with said drill and adapted to abut the work for controlling said valve mechanism, and means for adjusting said feeler to vary the position of the feeler relative to the position of the tool to determine the extent of drill movement into the work.

18. A drilling machine comprising a rotatable drill, pneumatic mechanism for moving the drill longitudinally into and out of the work, valve mechanism for controlling said pneumatic mechanism, said valve mechanism comprising a valve casing having a pair of valves therein for controlling the passage of motive fluid therethrough to said pneumatic mechanism, and means including a member adapted to abut the work for automatically shifting one of said valves when the tool has moved a predetermined distance into the work.

19. A drilling machine comprising a rotatable drill, pneumatic mechanism for moving the drill longitudinally into and out of the work, valve mechanism for controlling said pneumatic mechanism, said valve mechanism comprising a valve casing having a pair of valves therein for controlling the passage of motive fluid therethrough to said pneumatic mechanism, means for automatically shifting one of said valves when the tool has moved a predetermined distance into the work, and a manually operable control valve for admitting motive fluid to shift said last named valve in the opposite direction.

20. A drilling machine comprising a rotatable drill, pneumatic mechanism for moving the drill longitudinally into and out of the work, valve mechanism for controlling said pneumatic mechanism, said valve mechanism comprising a valve casing, having a pair of valves therein for controlling the passage of motive fluid therethrough to said pneumatic mechanism, and a manually controlled valve for admitting motive fluid to shift one of said valves to initiate the forward movement of said tool into the work.

21. A drilling machine comprising a rotatable drill, pneumatic mechanism for moving the drill longitudinally into and out of the work, valve mechanism for controlling said pneumatic mechanism, said valve mechanism comprising a valve casing having a fluid actuated valve and a mechanically actuated valve therein for controlling the passage of motive fluid therethrough to said pneumatic mechanism, and means, including a member adapted to abut the work, for automatically shifting said mechanically actuated valve when the tool has moved a predetermined distance into the work thereby to permit the motive fluid to actuate said fluid actuated valve.

22. A drilling machine comprising a rotatable drill, pneumatic mechanism for moving the drill longitudinally into and out of the work, valve mechanism for controlling said pneumatic mechanism, said valve mechanism comprising a valve casing having a pair of valves therein for controlling the passage of motive fluid therethrough to said pneumatic mechanism, one of said valves being controlled by action of the motive fluid thereagainst, the other of said valves being mechanically controlled, and means, including a member adapted to abut the work, for automatically shifting said mechanically controlled valve when the tool has moved a predetermined distance into the work, and a manually operable control valve for admitting motive fluid to shift said mechanically actuated valve in the opposite direction.

23. A drilling machine comprising a rotatable drill, pneumatic mechanism for moving the drill longitudinally into and out of the work, valve mechanism for controlling said pneumatic mechanism, said valve mechanism comprising a valve casing having a fluid actuated valve and a mechanically actuated valve therein for controlling the passage of motive fluid therethrough to said pneumatic mechanism, and means including a member engageable with the work for automatically shifting said mechanically actuated valve when the tool has moved a predetermined distance into the work thereby to permit the motive fluid to actuate said fluid actuated valve, and a manually controlled valve for admitting motive fluid to shift said mechanically actuated valve in a reverse direction to initiate the forward movement of said tool into the work.

In testimony whereof I have hereunto affixed my signature.

MARK H. DAMERELL.